June 13, 1967 R. L. FRANK ETAL 3,325,810
LORAN C CYCLE SELECTION SYSTEM
Filed July 19, 1965 5 Sheets-Sheet INVENTORS
ROBERT L. FRANK
JAMES I. MERANDA
ALAN H. PHILLIPS
BY
*Robert Haase*
ATTORNEY United States Patent Office 3,325,810
Patented June 13, 1967

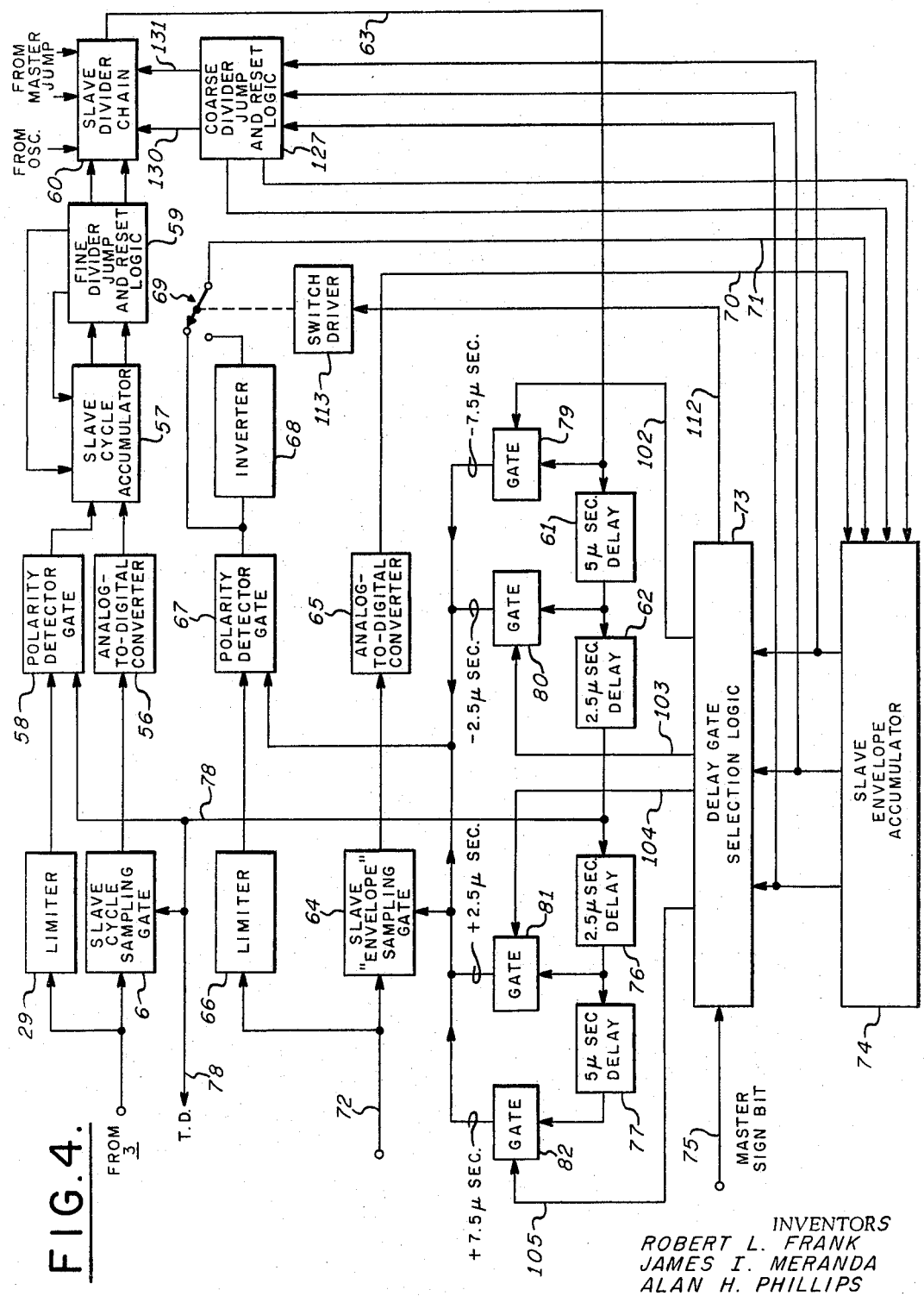

3,325,810
LORAN C CYCLE SELECTION SYSTEM
Robert L. Frank, Great Neck, James I. Meranda, Flushing, and Alan H. Phillips, Syosset, N.Y., assignors to Sperry Rand Corporation, Great Neck, N.Y., a corporation of Delaware
Filed July 19, 1965, Ser. No. 473,074
12 Claims. (Cl. 343—103)

ABSTRACT OF THE DISCLOSURE

A fully digitalized automatic cycle selector for a cycle-matching loran receiver wherein the carrier frequency cycles of the received loran pulses are sampled by discretely positionable sampling pulses to determine the location of the carrier cycle null most nearly corresponding to a prescribed point on the leading edge of each received pulse. Proper carrier cycle null identification is accomplished by means of a plurality of time-spaced sampling pulses which are utilized sequentially to sample the carrier cycles of a signal derived from each received pulse having the same carrier frequency as said received pulse and possessing a unique phase reversal at only one point which corresponds to said prescribed point.

---

The present invention generally relates to automatic means for resolving cyclic ambiguity in a loran C receiver and, more specifically, to such means whose design is fully compatible with modern solid-state digitalized instrumentations.

A loran C system is a pulsed type of hyperbolic navigation system. A first transmitting station, known as a master station, transmits pulses of a 100 kilocycle carrier signal at a constant repetition rate. Two or more additional transmitting stations, known as slave stations, transmit identical pulses synchronized to the master station transmissions. A receiver located in the area serviced by the master and two or more of the slave transmitters measures the difference in the time of arrival of pulses from each of the slave stations relative to the time of arrival of corresponding pulses from the master station. Each respective time difference measurement establishes a hyperbolic line of position along which the receiver is located. The intersection of two or more lines of position establishes the location of the receiver relative to the transmitters. In the loran C receiver, a precise time difference measurement is made using the carrier component of the received master and slave transmissions. That is, the time difference is determined by measuring the phase difference between the actual carrier cycles of the master and slave signals. In order to resolve the cyclic ambiguity inherent in such a time or phase measurement, one master carrier cycle and one slave carrier cycle are selected with the aid of the envelope characteristic of the received signals. The envelope-controlled selection assures that the carrier measurement is made between precisely corresponding carrier cycles.

The problem of master cycle selection is the problem of selecting that master carrier cycle null which corresponds most closely to a prescribed point on the leading edge of the received master pulse envelope. The problem of slave carrier cycle selection is the problem of selecting that slave carrier cycle null which corresponds precisely to the carrier cycle null selected on the master signal. The task of cycle selection is complicated by the facts that the carrier cycle-to-envelope phase relationship can change, e.g., the carrier cycle nulls can vary in time with respect to the signal envelope, the pulse shapes can change and the amplitude of the pulse can vary.

One object of the present invention is to provide automatic master and slave cycle selection means which are substantially insensitive to changes in carrier cycle-to-envelope phase relationship when the changes are common to the received master and slave signals.

Another object is to provide automatic master and slave cycle selection means which are substantially insensitive to changes in pulse shapes which are common to the received master and slave pulses.

An additional object is to provide automatic master and slave cycle selection means which are substantially insensitive to the amplitudes of the received master and slave signals and to changes in said amplitudes whether or not the changes are common to both signals.

Another object is to provide automatic master and slave cycle selection means whose design is fully compatible with modern solid-state digitalized instrumentations.

These and other objects of the present invention, as will appear from a reading of the following specification, are accomplished in a preferred solid-state digitalized species by the provision of an automatic master cycle selecter which determines the master signal envelope error and an automatic slave cycle selector whose operation depends upon the difference between the master and the slave signal envelope errors. Envelope error is defined as the time displacement between a prescribed point on the leading edge of the received master and slave pulse envelopes and the carrier cycle null (crossover) selected. Envelope error is determined with the aid of envelope sampling pulses which are time displaced from each other by ½ a carrier cycle. The envelope sampling pulses are used alternatively to sample respective adjacent peaks of the carrier cycles of waveforms specially derived from the received master and slave loran pulses. The envelope sampling pulses straddle a cycle sampling pulse which samples the carrier cycle null of the received loran pulse intermediate the carrier cycle peaks being sampled by the envelope sampling pulses. If the master envelope error is found to be less than plus or minus the period of ¼ a carrier cycle, the master carrier sampling pulse is sampling the correct master carrier null. If the difference between the master and slave envelope errors is found to be less than plus or minus the period of one-half carrier cycle, the slave carrier sampling pulse is sampling the correct slave carrier pulse. Should the master envelope error exceed the stated amount, the timing of the master carrier and envelope sampling pulses is abruptly jumped by an amount equaling one-half a carrier cycle and in a direction to reduce the master envelope error. Should the difference between the master and slave envelope errors exceed the stated amount, the timing of the slave carrier and envelope sampling pulses is jumped by an amount equaling a full carrier cycle.

In prior systems, the positions of the envelope and carrier sampling pulses are continuously variable relative to the signals being sampled. In the present invention, however, the sampling pulse positions are varied only in digital increments or "jumps" in order to fully exploit the advantages of digitalized instrumentations over prior art analog designs. The jump increments can be made arbitrarily small, for example, 0.5% of a carrier cycle, where the problem is to align a carrier sampling pulse with any carrier cycle null. Such small increments cannot be employed in the case of the envelope sampling pulses unless the envelope function of the received master and slave pulses actually is produced by a detector. In order to derive a signal representing the envelope characteristic of a received pulse modulated carrier signal without detecting said signal, as in the present invention, it is necessary to sample the undetected carrier signal synchronously with the peaks of the respective carrier cycles. Consequently, the envelope sampling pulses of the present invention can be varied in multiples of one-half carrier cycle only (the separation between adjacent carrier cycle peaks).

As previously mentioned, the carrier envelope-to-cycle phase relationship can vary in each of the received master and slave pulses. The consequence is that the prescribed point being sought on the leading edge of the received pulse envelope does not necessarily coincide in time with any carrier cycle null. Thus, it is not readily possible to measure accurately the envelope error, i.e., the time difference between the prescribed envelope point and the cycle null selected, by using a single envelope sampling pulse which is positionable only in time increments corresponding to multiples of one-half cycles of the carrier.

In accordance with the present invention, the effective position of the envelope sampling pulses with respect to the straddled cycle sampling pulse is changed in increments much finer than the permissible one-half carrier cycle increments by sampling the specially derived master and slave pulse envelope carrier waveforms using the individual envelope sampling pulses in succession. In effect, a virtual envelope sampling pulse is generated whose position can be varied substantially continuously within pre-established limits of a carrier cycle from the aforesaid cycle sampling pulse by controlling the ratio of the time that one envelope sampling pulse is used to the time that another sampling pulse is used. By changing said ratio, the position of the virtual envelope sampling pulse can be aligned to the prescribed envelope point, provided that the master envelope error is less than plus or minus one-fourth a carrier cycle period. The cycle sampling pulse is time shifted or jumped by one-half the carrier cycle period in the event that the master envelope error is greater than plus or minus one-fourth a carrier cycle period. Following this, the envelope servo again attempts to align the virtual envelope sampling pulse to the prescribed envelope sampling point. If it fails, the cycle sampling pulse is jumped again. When the master envelope error is reduced to a value less than said amount, the jumping terminates and the virtual envelope sampling pulse is accurately positioned to the prescribed master envelope point.

A signal whose duty cycle represents the position of the virtual master envelope sampling gate, with respect to the master cycle sampling gate, i.e., whose duty cycle represents the magnitude of the master envelope error, is applied to a circuit which controls the selection of the slave envelope sampling gates. The virtual slave envelope sampling gate is abruptly time-shifted or jumped in the event that the difference between the master envelope error and the slave envelope error expressed in time units is greater than plus or minus one-half a carrier cycle period. The magnitude of each jump is the time equivalent of a full carrier cycle. The jumping continues until the envelope error difference is reduced to an amount less than one-half the carrier cycle period. When the error difference falls below said amount, the jumping ceases and it is concluded that the slave envelope sampling gates have been properly positioned. The ultimately desired time difference measurement between the master and slave received pulses is made by measuring the time displacement between the master cycle sampling gate and the slave cycle sampling gate after the respective master envelope and slave envelope sampling gates have been properly positioned and the "jumping" has been terminated.

For a more complete understanding of the present invention, reference should be had to the following specification and to the appended figures of which:

FIGURE 4 is a simplified block diagram of apparatus for selecting the proper slave carrier cycle null;

Figure 1:
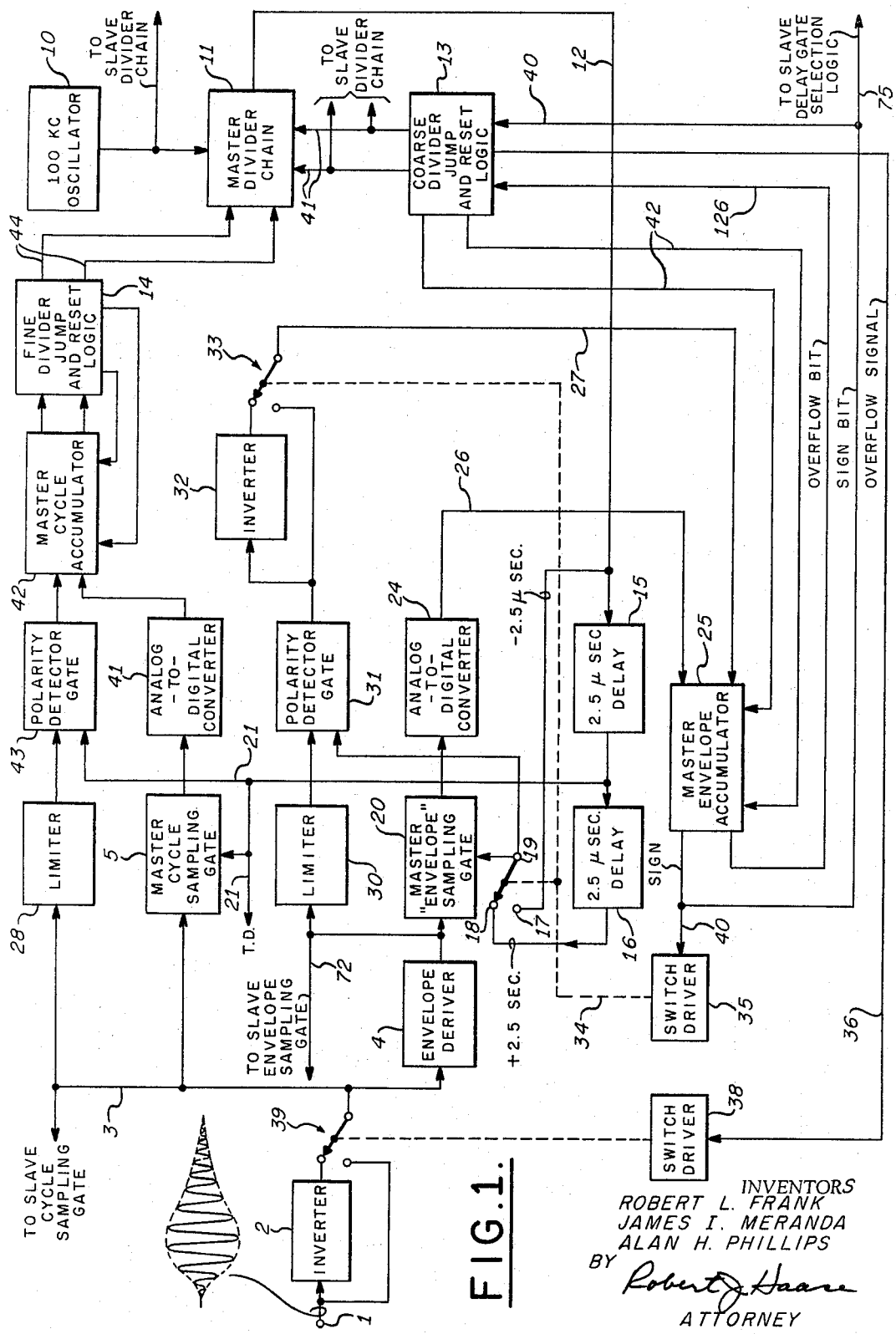
FIGURE 1 is a simplified block diagram of apparatus for selecting the proper master carrier cycle null.
Figure 2:
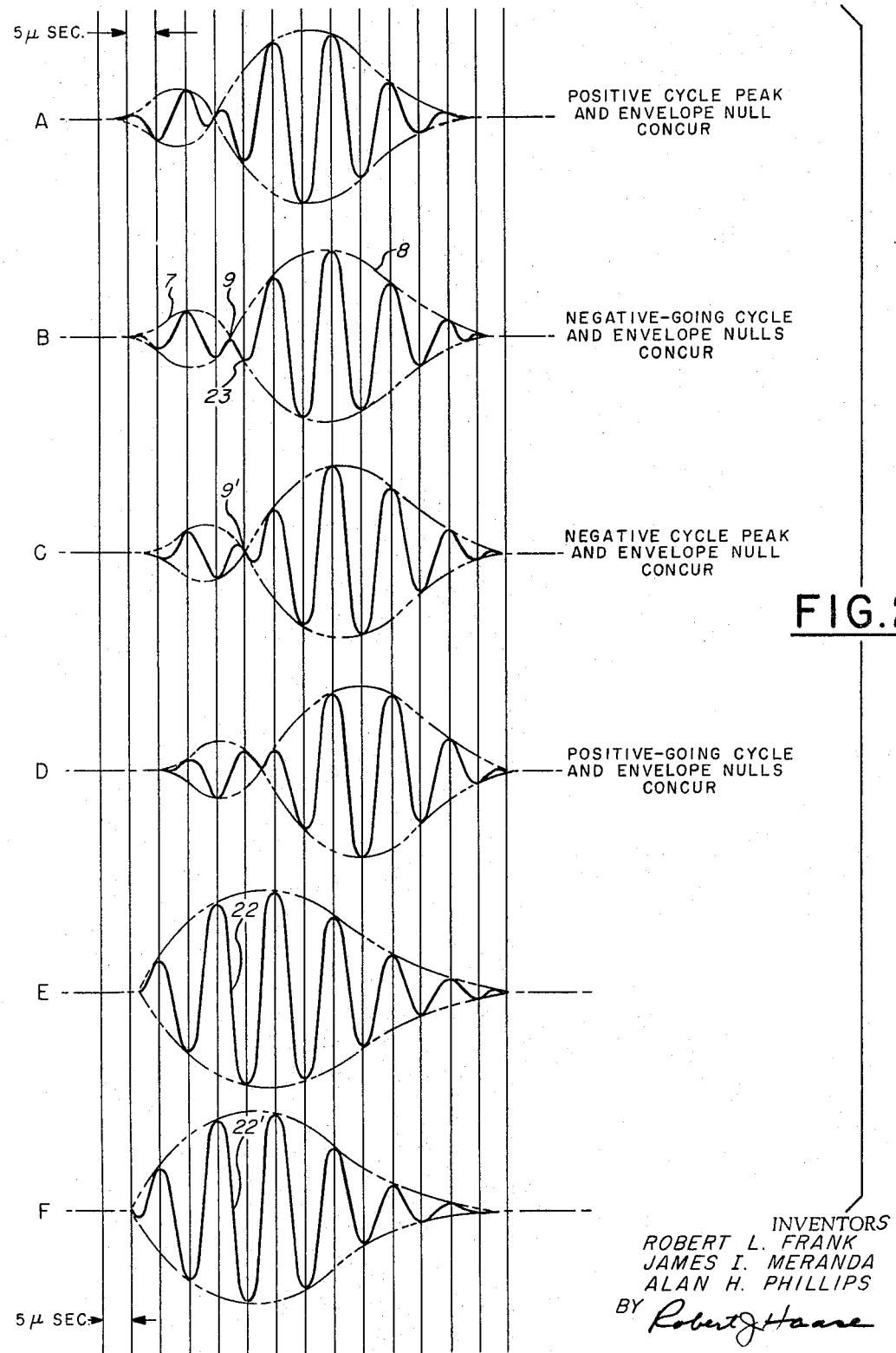
FIGURE 2 is a series of idealized specially shaped waveforms, derived from the received master and slave signals useful for selecting the proper master and slave carrier cycle nulls.

Referring to FIGURE 1, pulsed master and slave signals are received and amplified in a conventional manner (not shown) without being detected and are applied to input line 1. Neglecting for the moment the function of inverter 2, the master and slave pulses are routed by line 3 to envelope deriver 4, master cycle sampling gate 5 and limiter 28 of FIGURE 1 and to limiter 29 and slave cycle sampling gate 6 of FIGURE 4. Envelope deriver circuit 4 of FIGURE 1, in a typical case, delays and attenuates the pulse carrier signal as applied to line 1 by the time of ½ carrier cycle, and combines the delayed and undelayed (attenuated) carrier signals to produce, after amplification and inversion, a "derived" waveform such as the waveforms depicted in FIGURE 2. A suitable envelope deriver is described in United States Coast Guard Technical Manual for Loran Receiving Set AN/SPN–30 of November 1961 identified by the Coast Guard Publication No. CG–273–81. Each of the waveforms of FIGURE 2 is characterized by a first portion 7 and a second portion 8 on either side of "envelope" null 9. The phase of the carrier within portion 7 is opposite to the phase of the carrier of the received loran pulse on line 1 of FIGURE 1. The phase of the carrier within portion 8 of the derived pulse is the same as the phase of the received loran pulse carrier. Thus, a phase reversal is produced in the carrier of the derived waveform as the derived waveform passes through null 9. No phase reversal occurs at any other carrier null within the derived waveform. It is to be noted that the derived waveform is an undetected carrier waveform. For this reason, the envelope characteristic is shown by the dotted line which conforms to the peaks of the individual derived waveform cycles.

The position of the null 9 can be changed by adjustment of the envelope deriver network 4 of FIGURE 1 by changing the respective contributions of the delayed and the undelayed components which comprise the derived waveform. Once set, null 9 will be fixed relative to the start of the received loran pulse applied to line 1 independent of amplitude changes in the received pulse. Null point 9 is subject to time displacement in the event that the carrier-to-envelope phase relationship should change at any of the loran transmitting stations or in the event that certain changes take place in the propagation path between the loran stations and the receiver. Changes in the carrier-to-envelope phase relationship which are common to both of the received master and slave loran pulses do not introduce an inaccuracy in the time difference measurement provided by the present invention. However, even common changes in the carrier-to-envelope phase relationship create a problem in resolving the ambiguity inherent in the selection of corresponding master and slave carrier cycles incident to the time difference measurement.

The derived waveforms A, B, C and D of FIGURE 2 show the effect of some of the envelope-to-cycle phase relationships that might obtain in the received master and slave loran pulses. In the derived waveform A, a positive cycle peak of the received loran pulse concurs with the derived envelope null point 9. In waveform B, a negative-going carrier cycle null concurs with the derived envelope null. A negative cycle peak concurs with the derived envelope null in waveform C. A positive-going cycle null concurs with the derived envelope null in waveform D. Master carrier cycle selection is made on the basis that the desired carrier cycle null is the one closest to the occurrence of the master derived envelope null. The derived envelope null and the carrier cycle null corresponding to the received master pulse are located through the use of three sampling gates which are time displaced from each other by an amount equaling one-quarter of a carrier cycle. Assuming a carrier frequency of 100 kiloseconds per second, the three sampling gates are separated from each other by 2.5 microseconds.

Referring to FIGURE 1, the three sampling gates recur at the loran pulse repetition rate and are derived from oscillator 10 and master divider 11 which divides the frequency of the signal from oscillator 10 by a known amount to provide on line 12 a recurrent series of pulses at the loran pulse repetition rate. The time positioning or time phasing of the pulses on line 12 (as distinguished from the repetition rate thereof) is varied in coarse increments by signals from logic 13 and in fine increments by signals from logic 14. The time phasing of the pulses on line 12 is advanced in a conventional manner by introducing an extra pulse once during each repetition interval in master divider chain 11 to cause a premature output on line 12. Conversely, the time phasing of the pulse on line 12 is retarded by blocking one pulse during each repetition interval within master divider chain 11 to cause a delayed output on line 12. Each of the logic circuits 13 and 14 may advance or retard the timing of the pulse on line 12 in the described manner. However, the output from logic circuit 13 provides coarse increments of advancement or retardation whereas logic circuit 14 provides finer increments.

The pulses on line 12 are applied to serially connected 2.5 microsecond delays 15 and 16 and to switch contact 17. The output of delay 16 is connected to switch contact 18. Depending upon the position of movable switch member 19, either the pulse at the input to delay 15 or the pulse at the output of delay 16 is applied to master envelope sampling gate 20. The pulses appearing at the output of delay 15 are applied via line 21 to master cycle sampling gate 5. It will be seen that the master cycle sampling pulse and the selected envelope sampling pulse always are time displaced from each other by 2.5 microseconds which amount equals the period of ¼ a carrier cycle of the received loran pulse. Assuming that the envelope-to-cycle phase relationship of waveform C in FIG. 2 obtains and movable switch member 19 is in the position shown, the selected envelope sampling pulse at the output of delay 16 samples the envelope null 9' of waveform C at the same time that the cycle sampling pulse applied to gate 5 samples the negative-going carrier null 22 of waveform E which represents the original underived pulse carrier waveform on line 1 corresponding to waveform C. In that event, no signal will appear at the output of gate 20. Should the envelope-to-cycle phase relationship of the pulse on line 1 be as shown in waveform B rather than waveform C of FIGURE 2, then the envelope sampling pulse would sample the amplitude of the carrier cycle peak 23 when the cycle sampling pulse is aligned to the negative-going carrier null 22' of the corresponding underived pulse carrier waveform F. The output signal provided by gate 20 is applied to analog-to-digital converter 24 which converts the pulse sample at the output of gate 20 to an equivalent digital signal whose value represents the amplitude of said pulse sample. The digital signal is applied to master envelope accumulator 25.

Accumulator 25 is operative to add the values of the numbers represented by the digital signals on line 26 in a sense determined by the signal applied via line 27. If, for example, the signal on line 27 represents the operation of addition, then the value of the number represented by the signal stored in accumulator 25 will increase in a positive sense in accordance with the numerical value represented by the signal on line 26. In the event that the signal on line 27 represents a subtractive operation, then the number represented by the signal stored in accumulator 25 will decrease in accordance with the numerical value represented by the signal on line 26.

The additive or subtractive operation represented by the signal on line 27 is determined as follows. The derived waveform at the output of circuit 4 is applied to amplitude limiter 30. The resultant waveform is applied to polarity detector gate 31 which is rendered conductive synchronously with master envelope sampling gate 20 by the sampling pulses selected by switch member 19. Gate 31 produces a pulsed output signal whose polarity is determined by the polarity of the carrier cycle of the derived waveform being sampled. The pulsed output signal determines the direction of counting in accumulator 25 and is applied to accumulator 25 either directly or via inverter 32, depending upon the position of switch 33. The position of switch 33 in turn, is determined jointly with the position of switch member 19 by linkage 34 at the output of switch driver 35. Switch driver 35 is actuated in accordance with the sign of the signal produced on line 40, which indicates the sign of the number represented by the signal stored in accumulator 25. The switch position shown is for positive data. With the aid of logic 13, accumulator 25 causes an overflow output signal to be produced on line 36 each time that the numerical capacity of the accumulator is exceeded by the stored count. The overflow output signal is applied to switch driver 38. Switch driver 38 changes the position of switch 39 each time an overflow occurs which, in turn, causes the received loran pulse on line 1 to be routed either directly or via inverter 2 to line 3.

Assuming for the moment that the sampling pulse of line 21 is sampling a carrier cycle null of the received master pulse in sampling gate 5 and that switch 19 is in the position shown, master envelope sampling gate 20 produces an output signal representing the deviation of the envelope sampling pulse from the derived envelope null such as the null 9 of waveform B of FIGURE 2. The sense of the deviation is determined by limiter 30 and polarity gate 31. The position of switch 33 is set in accordance with the sign of the count existing in accumulator 25 whereby the additive or subtractive operation of accumulator 25, in response to the signal from converter 24 is determined jointly by the polarity of the signal at the output of gate 31 and the setting of switch 33.

Assuming further that the envelope sampling pulse selected by switch 19 is not concurrent with the derived envelope null, the same number is successively subtracted (or added depending upon the sense of the deviation) to the count in accumulator 25 each time that a pulse occurs on line 12. Let it be further assumed that the count in accumulator 25 is positive and is decreasing in response to successive signals from converter 24. Eventually, the count will be driven through zero and into a negative value. Accumulator 25 produces a signal on line 40 representing its traversal through zero count to actuate driver 35 and switches 19 and 33. The resulting reversals of switches 19 and 33 replaces the sampling pulse from delay 16 with the sampling pulse at the input of delay 15 and inverts the effect of the output signal from gate 31 in controlling the additive and subtractive operations of accumulator 25.

If the cycle sampling pulse on line 21 is aligned exclusively with the proper carrier cycle, then the sampling pulse at the input to delay 15 will lie on the opposite side of the derived envelope null than the sampling pulse at the output of delay 16. If the cycle sampling pulse of line 21 is aligned with an incorrect carrier cycle null, then the sampling pulse at the input to delay 15 will lie on the same side of the derived envelope null as the sampling pulse at the output of delay 16. If the former case obtains, then the substitution of the sampling pulse at the input to delay 15 and the reversal of switch 33 introduce a number into accumulator 25 of a sense causing the direction in which the count had been changing to reverse so that the count in accumulator 25 is driven back towards zero. When the count traverses zero, switches 19 and 33 are reset to their originally assumed positions, completing a cycle of operation.

If the derived envelope null is located midway between the envelope sampling pulses, then the count in accumulator 25 will traverse zero each time a pulse appears on line 12. Generally, the position of the derived envelope null with not lie midway between the two envelope sampling pulses. In the latter, case, the amplitudes of the signals provided by gate 20 in response to the respective sampling pulses will not be equal. Accordingly, the count in accumulator 25 will change by one amount in response to one of the envelope sampling pulses and by a different amount in response to the other sampling pulse. The result is that the count stored in accumulator 25 will be of one sign (positive or negative) in response to one pulse on line 12 and will be of the opposite sign for a time equaling a plurality of repetition intervals of the pulses on line 12. The ratio of the time that the count in accumulator 25 is, say, positive to the time that the count is negative is a direct measure of the time of occurrence of the derived envelope null relative to the times of occurrences of the envelope sampling pulses selected by switch 19.

If, on the other hand, the envelope sampling pulses do not lie on opposite sides of the derived envelope null, then the direction in which the count had been changing in accumulator 25 just prior to traversing through zero value is continued even after the opposite sampling pulse is selected by switch 19. Rather than dithering between small positive and negative values, the count in the accumulator will continue to grow in magnitude either in the positive or in the negative sense (depending upon the sense of the time displacement between the derived envelope null and both envelope sampling pulses) until eventually the value in the accumulator 25 exceeds in absolute value, a maximum permissible value and an overflow signal is generated. The overflow bit signal on line 126 and the sign bit signal on line 40 are applied to coarse divider jump and reset logic 13 wherein they give rise to control signals on lines 41, in a manner to be described in connection with FIGURE 3, for jumping the pulses on line 12 from divider chain 11 by an increment equaling one-half a carrier cycle period of the received pulse on line 1. Simultaneously, circuit 13 generates control signals on lines 42 to reset the count in accumulator 25 to nearly the maximum count opposite in sign to the one from which it just overflowed. For example, if M is the maximum permissible magnitude in the accumulator, and if the value in the accumulator exceeds +M, then in effect 2M will be subtracted from the accumulator, leaving it with a negative value and slightly below M in magnitude. The reversal in value of the accumulator digital word from its immediate pre-existing value causes another actuation of switches 19 and 33.

Following the jump in the timing of the pulses on line 12 and, consequently, in the timing of the envelope sampling pulses selected by switch 19, the sampling of the derived envelope waveform is resumed in gate 20 utilizing an envelope sampling pulse opposite to the one which had been used when accumulator 25 overflowed. Assuming, for example, that the count of accumulator 25 overflowed from a maximum negative value, circuit 13 resets the count to nearly a maximum positive value whereby the renewed sampling of the derived waveform causes the value of the count in the accumulator to proceed in the same direction (negative) as existed just prior to the overflow. Eventually, the count will traverse zero value, the sampling gates will be interchanged, switch 33 will be actuated and the count will continue to change negatively until a second negative overflow is produced to complete another cycle of operation. The cycles of operation continue until, finally, the traversal of zero count causes the selection of a new envelope sampling pulse which lies on the opposite side of the derived envelope null from the side of the immediately prior envelope sampling pulse in use.

During the time that the envelope sampling pulses are being used in alternation to seek out the position of the derived envelope null, a related operation is taking place with respect to the carrier cycles of the underived received loran pulse. It was previously noted that the envelope synchronization system rejects all of the nulls in the derived waveform except one. It is the nature of the cycle synchronization system to achieve synchronization with any of the nulls of the underived waveform typified by waveform E of FIGURE 2. Cyclic ambiguity, i.e., the inability of the cycle synchronization means to distinguish between the nulls is resolved through the operation of the envelope synchronization means.

The cycle synchronizing apparatus comprises master cycle sampling gate 5, analog-to-digital converter 41, master cycle accumulator 42, limiter 28, polarity detector gate 43, fine divider jump and reset logic 14, master divider chain 11 and delay 15. The master cycle synchronizer, like the master envelope synchronizer, is a closed loop servo mechanism. In operation, the cycle synchronizer establishes concurrence between the cycle sampling pulse on line 21 and any one null of the loran pulse on line 3. The envelope synchronizer, on the other hand, ultimately causes the derived envelope null to be straddled by the two envelope sampling gates which are selected in alternation by switch 19.

Master cycle sampling gate 5 provides a pulsed output signal to converter 41 representing the deviation between the cycle sampling pulse on line 21 and the nearest carrier cycle null of the loran pulse on line 3. Converter 41, like converter 24, produces a digital signal representing the value of the pulse amplitude at the output of the sampling gate. The digital signal is applied to accumulator 42 wherein it is either added to or subtracted from the count already stored therein in accordance with the "add" or "subtract" control signal provided by limiter 28 and detector gate 43 which function in the same manner as the limiter 30 and detector gate 31. In the usual case where the cycle sampling gate does not precisely coincide with the carrier cycle null, the count in accumulator 42 continuously increases or decreases (as the case may be depending upon the sense of the displacement between the sampling pulse and the cycle null) until the capacity of the accumulator is exceeded and overflow signals are applied to fine divider jump and reset logic 14. In response to each overflow signal from accumulator 42, logic 14 produces control signals on lines 44 which jump the pulses on line 12 through a time increment which is a small fraction of a carrier cycle period of the received loran pulse. The jumping continues until the pulses on line 12 have been phased to substantially concur at sampling gate 5 with a given cycle null of the signal on line 3. If the cycle null synchronized to by the action of the synchronizer is the correct one, then master envelope accumulator 25 will not overflow and there will be no jump signal on lines 41 to cause the pulses on line 12 (hence all of the cycle and envelope sampling gates) to jump by the coarse increment of one-half a carrier cycle period. If the cycle null synchronized to is not the cycle null nearest to the derived envelope null, then the conditions necessary for satisfying the requirements of the envelope synchronizer will not have been met with the result that accumulator 25 will overflow as many times as necessary to jump all the sampling pulses to the correct time relation with respect to the received loran pulse. When both the cycle synchronizer and the envelope synchronizer have performed their required functions, the envelope sampling pulses will straddle the derived envelope null and the cycle sampling pulse will substantially concur with the carrier cycle null nearest to the derived envelope null.

Figure 3:
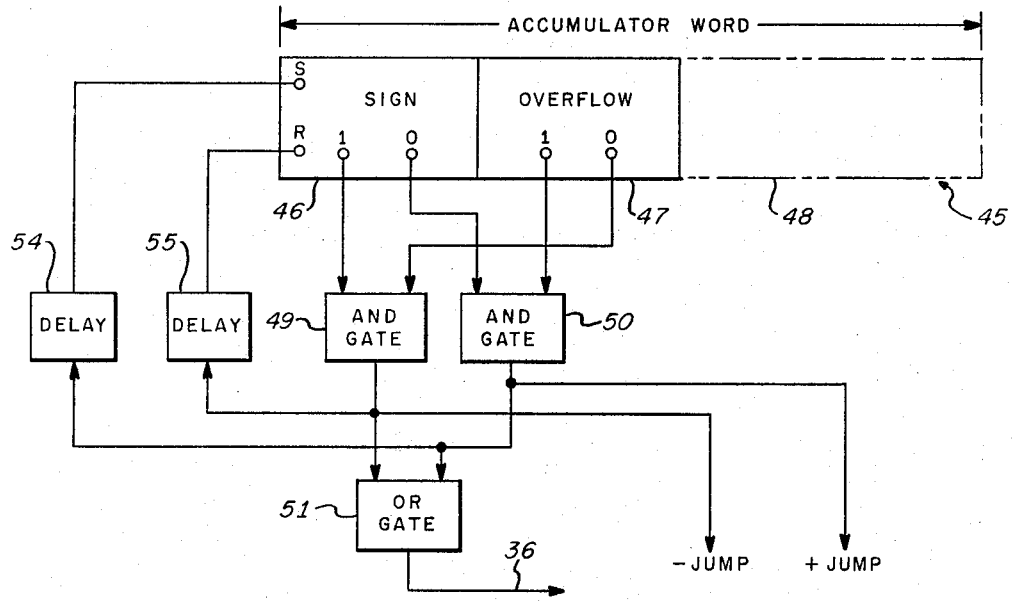
FIGURE 3 is a simplified block diagram of each of the divider jump and reset logic components represented in FIGURE 1 and of the fine divider jump and reset logic component of FIGURE 4.

The divider jump and reset logic represented by the numerals 13 and 14 in FIGURE 1 and numeral 59 of FIGURE 4 may be instrumented in accordance with the more detailed block diagram of FIGURE 3. The numeral 45 of FIGURE 3 represents, for example, the register component of accumulator 42 in which the master cycle digital word is stored under the control of converter 41 and detector gate 43. The most significant bit of the word is represented by sign bit 46. The next most significant bit 47 is designated the overflow bit. All of the remaining bits are represented by stages 48 of register 45. Stage 46 of register 45 is in binary state "zero" if the count represented by stages 48 has a positive value. Stage 46 is in binary state "one" if the count of stages 48 has a negative value. The condition of overflow occurs when the state of sign stage 46 is opposite to the state of overflow stage 47. AND gates 49 and 50 determine the existence of opposite binary states in stages 46 and 47. The "one" output of stage 46 and the "zero" output of stage 47 are connected to AND gate 49. Conversely, the "zero" output of stage 46 and the "one" output of stage 47 are connected to AND gate 50. The outputs of gates 49 and 50 are coupled to OR gate 51 which produces an output when the states of stages 46 and 47 are opposite irrespective of which stage is in state "one."

The sense of the overflow of register 45 also must be determined. The sense in which the divider chain 11 is to be jumped (advanced or retarded) depends upon whether accumulator 45 overflowed negatively (from a maximum negative value) or whether it overflowed positively (from a positive maximum value). The sense of the overflow is determined by AND gates 49 and 50. AND gate 50 has an output when there is a positive overflow, representing a required positive jump (advance) of the pulses of line 12 of FIGURE 1. Gate 49 has an output representing a negative overflow and produces an output representing a minus jump or retardation. As previously discussed, the count in the accumulator subsequent to the occurrence of an overflow is reset to a value opposite in polarity to the one from which the overflow took place and slightly smaller in magnitude. The resetting is accomplished through the use of delays 54 and 55. Delay 54 changes the sign bit 46 to a binary "one" if overflow stage 47 has been a "one" at the time of overflow. Similarly, delay 55 changes sign bit 46 to a "zero" if overflow stage 47 has been a "zero" at the time of overflow. By forcing the sign bit to the same binary state as the state of the overflow bit at the time of overflow, the count in the register 45 is reset to the opposite polarity existing at the time of overflow, and slightly less than the threshold value in magnitude.

The operation of the slave synchronizer of FIGURE 4 is in some respects similar and in other respects different from that of the master synchronizer of FIGURE 1. Like the master synchronizer, the slave synchronizer comprises two interrelated servo loops, one for achieving synchronization with any carrier cycle null of the underived received slave loran pulse and the other for seeking out the envelope null. The operation of the slave cycle synchronizer comprising units 6, 56, 57, 29, 58, 59, 60, 61 and 62 is fully equivalent to master cycle synchronizer of FIGURE 1 with the inconsequential exception that a total of 7.5 microseconds delay is introduced into the sampling pulses of line 63 by units 61 and 62 whereas only 2.5 microseconds delay is introduced in the sampling pulse of line 12 of FIGURE 1 by delay 15. The extra delay in the slave cycle sampling pulses has no effect whatever on slave cycle synchronization but is significant with respect to slave envelope synchronization.

It was previously noted that the problem of slave cycle identification is different from the problem of master cycle identification. It is only required that the master synchronize to a carrier cycle null on the leading edge of the received master pulse nearest to a prescribed envelope point characterized by the master derived envelope null. The slave synchronizer, on the other hand, must seek out that particular slave carrier cycle null which corresponds to the selected master cycle carrier null. The slave carrier null to be selected by the action of the slave synchronizer is not necessarily that null nearest to the slave derived envelope null. This follows from the fact that the envelope-to-cycle phase relationship (hence the derived envelope null-versus-cycle null relationship) is subject to variation in both the master and slave signals.

The envelope-to-cycle phase relationship of a given received loran pulse depends upon the characteristics of istics of the path of transmission betwen the transmitistics of the path of transmiss ion between the transmitting station and the receiver. The transmitting stations, of course, do not share identically the same apparatus and the transmission paths are not identical. Consequently, it is not practical to attempt to maintain a specified envelope-to-cycle phase relationship for each of the master pulse or the slave pulse at the receiver. However, the envelope-to-cycle phase relationship of the slave signal as received can be maintained within a specified tolerance (±½ a carrier cycle) with respect to the envelope-to-cycle phase relationship of the received master pulse. Accordingly, the slave synchronizer in the receiver of the present invention seeks out and finds that carrier cycle null of the received slave signal which satisfies the requirement that the difference between the master and slave envelope errors is less than plus or minus one-half a carrier cycle. The slave envelope synchronizer includes sampling gate 64, converter 65, limiter 66, polarity detector gate 67, inverter 68, and switch 69 which coact to produce on lines 70 and 71 a first signal representing the deviation of the selected envelope sampling pulse from the envelope null and a second signal representing the sense of said deviation in a manner fully equivalent to the generation of the signals on lines 26 and 27 of FIG. 1. Slave envelope sampling gate 64 receives an input signal from line 72 which is also connected to the output of envelope deriver 4 of FIG. 1. The selection of the slave envelope sampling pulses is determined by selection logic 73 in accordance with the value of the count stored in accumulator 74 and the value of the sign bit of the master envelope word applied via line 75 from accumulator 25 of FIG. 1. The slave derived envelope nulls are sampled by pulses derived from line 63 at the output of divider chain 60 which pulses pass through serially connected pulse delay circuits 61, 62, 76 and 77. Delays 61 and 77 introduce a five microsecond delay (½ a carrier cycle period) whereas delays 62 and 76 introduce a 2.5 microsecond delay as indicated in the drawing. The slave carrier cycle nulls are sampled by the pulses on line 78 at the output of delay 62. Consequently, the pulses on line 63 are designated —7.5 microsecond sampling pulses because they precede the carrier cycle null sampling pulses on line 78 by 7.5 microseconds. Similarly, the pulses at the output of delay 61, at the output of delay 76 and at the output of delay 77 are designated —2.5 microsecond, +2.5 microsecond and +7.5 microsecond pulses, respectively. One of the four available slave envelope sampling pulses is selected at a given time depending upon which of the gates 79, 80, 81 and 82 is actuated by delay gate selection logic 73.

Slave envelope accumulator 74 performs a function fully equivalent to the function of accumulator 25 of FIG. 1. More specifically, the count of accumulator 74 changes in increments determined by the signal on line 70 in a sense determined by the signals on line 71 until certain prescribed count values are traversed. It will be recalled that in the case of master envelope accumulator 25 of FIG. 1, three prescribed count values were involved, namely, zero value, a positive maximum value and a negative value. The traversal of the zero value caused an interchange of the master envelope sampling pulses whereas a traversal of either the positive or negative maximum values produced a five microsecond jump in the timing of all three sampling pulses. In the case of accumulator 74 of FIG. 4, however, four count values are of interest. As before, when either the positive or negative maximum value is exceeded, all of the sampling pulses are jumped. The jumping is initiated by logic 127 under the control of the three most significant bits of accumulator 74. In addition, the envelope sampling pulses are changed each time that the slave envelope count traverses a certain positive value and a certain negative value. If the factor +3K represents the maximum value of the count in the slave envelope accumulator and the factor −3K represents the negative maximum value of the count in the slave envelope accumulator, then +K and −K represent, respectively, the aforesaid two certain values.

Figure 6:
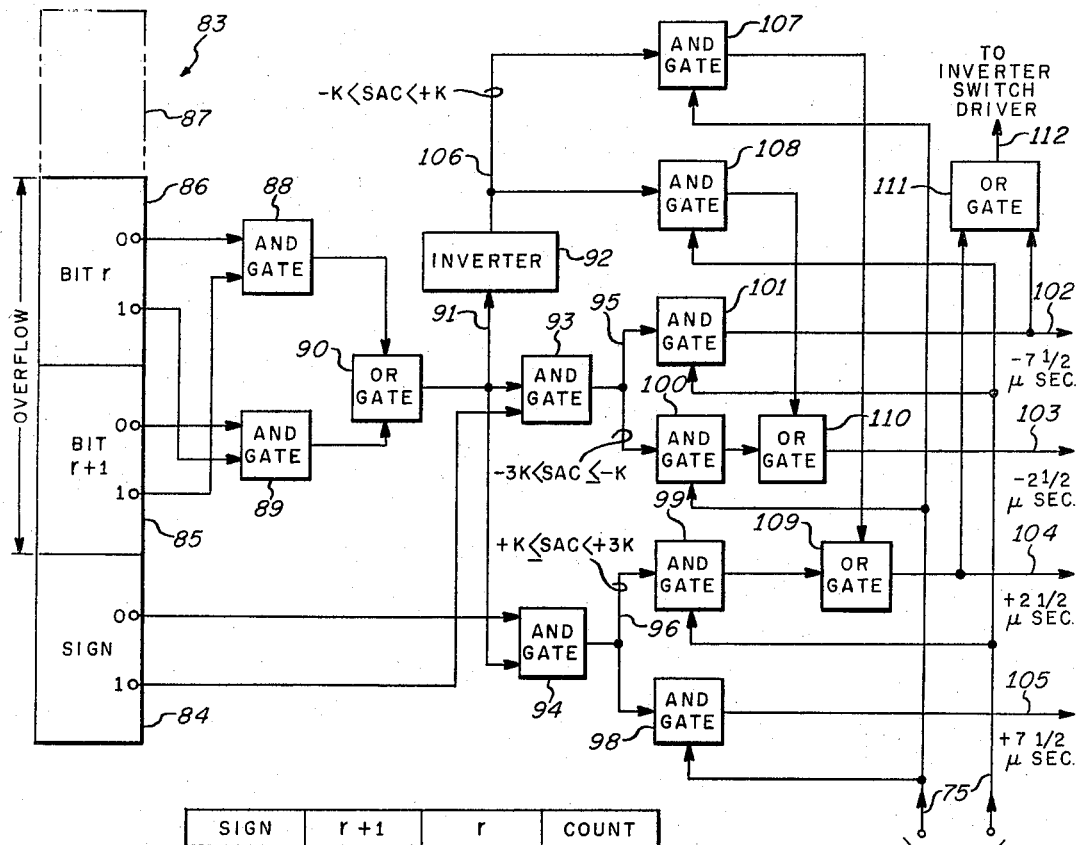
FIGURE 6 is a simplified block diagram of the delay gate selection logic component represented in FIGURE 4.

The manner in which the delay gate selection logic 73 operates in accordance with the transitions of the count in the slave envelope accumulator through the aforementioned values can be understood by reference to FIG. 6. The numeral 83 generally designates the register portion of accumulator 74. Stage 84 represents the sign bit of the slave envelope word. Stages 85 and 86 represent the overflow bits of the slave envelope word. The remaining lower significant stages of register 83 are designated by the numeral 87. By reference to the count value table A of FIG. 6, the relationship between the possible binary states of stages 84, 85 and 86 and the corresponding count values can be seen. The value of K varies directly with the number of lower significant stages 87 employed in register 83 and determines the degree of smoothing in the operation of the slave envelope synchronization servomechanism. As mentioned, the selected slave envelope sampling pulse is changed each time that the accumulator count, as represented by the binary states of the three most significant stages 84, 85 and 86, traverse the values of +K and −K. A first sampling pulse (−7.5 microseconds) is selected when the value of the count is greater than −3K and less than or equal to −K. A second sampling pulse (−2.5 microseconds) is selected when the value of the count lies between −K and +K. A third sampling pulse (+2.5 microseconds) is selected when the value of the count is equal to or greater than +K but less than 3K. The aforementioned sampling pulses are selected only if the count in the master envelope accumulator 25 is negative, i.e., the sign bit is "1." If the master envelope count is positive and the slave count is as just described, then the selected slave envelope sampling pulses would be −2.5 microseconds, +2.5 microseconds and +7.5 microseconds, respectively as shown in table B of FIG. 6.

Note that although the described embodiment produces 5 microsecond increments in the time delay of the envelope sampling trigger relative to the derived envelope null by delaying the sampling trigger, there are alternative methods: e.g., delay networks which delay the envelope without phase shifting the carrier could be added in series with the envelope deriver, or changes could be made in the envelope deriver to cause a shift in the derived envelope null, or combinations of these. This is true of the master envelope servo as well as of the slave envelope servo.

The selection of the slave envelope sampling pulses in accordance with table B of FIG. 6 is accomplished by the apparatus represented by the block diagram of FIG. 6. AND gate 88 receives the "one" output from stage 85 and a "zero" output from stage 86. Conversely, AND gate 89 receives the "zero" output from stage 85 and the "one" output from stage 86. Thus, either AND gate 88 or AND gate 89 produces an output in the event that the binary state of stage 85 is different from the binary state of stage 86. The outputs of gates 88 and 89 are combined in OR gate 90 which provides a signal on line 91 when stages 85 and 86 are in unlike binary states.

The signal on line 91 is applied jointly to inverter 92 and to AND gates 93 and 94. AND gate 93 additionally receives the "one" output of stage 84. AND gate 94 additionally receives the "zero" output of stage 84. Consequently, gate 93 produces a signal on line 95 whenever the value of the count represented by the states of stages 84, 85 and 86 is greater than −3K and less than or equal to −K in accordance with table B Analogously, gate 94 produces a signal on line 96 whenever the count of register 83 is equal to or greater than +K but less than +3K in accordance with table B.

Signals representing the binary stage of the master envelope word sign bit are transmitted via line 75 to gates 98, 99, 100 and 101 such that gates 98 and 100 are conditioned for conduction when the master word is positive and AND gates 99 and 101 are conditioned for conduction when the master word is negative. Gates 100 and 101 receive the signal on line 95 from gate 93. Gates 98 and 99 receive the signal on line 96 from gate 94. It can be seen that AND gate 101 provides an output on line 102 when the following two conditions are met (1) the value of the count in the slave envelope accumulator is greater than −3K and equal to or less than −K and (2) the master envelope word (count) is negative. Consequently, the signal on line 102 controls the conduction of gate 79 of FIG. 4 through which passes −7.5 microsecond slave envelope sampling pulse. Similarly, it can be seen that signals are produced on lines 103, 104 and 105 for controlling the conduction of gates 80, 81 and 82 of FIG. 4 through which pass the −2.5, +2.5 and +7.5 microsecond slave envelope sampling pulses, respectively, in accordance with table B.

The signal on line 91 is inverted by inverter 92 to provide a signal on line 106 whenever the value of the count in the slave envelope accumulator is greater than −K but less than +K. This occurs whenever the binary states of stages 85 and 86 are not unlike, i.e., are the same. This can be seen by reference to table A of FIG. 6. The signal on line 106 is applied jointly to AND gate 107 and AND gate 108. Gate 107 receives a signal from lines 75 when the master envelope word is positive. Gate 108 receives a signal from lines 75 when the master envelope word is negative. The output signal from gate 107 is combined with the output signal from gate 99 in OR gate 109 to provide the signal on line 104. The output signal from gate 108 is combined with the output signal from gate 100 in OR gate 110 to produce the signal on line 103.

It was previously noted that switch 33 of FIG. 1 is actuated each time that the sign of the master envelope word reverses. Concurrent with each sign reversal, the master envelope sampling pulse position is changed by five microseconds, e.g., from −2.5 microseconds to +2.5 microseconds relative to the master carrier cycle null sampling pulse. The actuation of switch 33 compensates for the fact that the changed sampling pulse samples an opposite polarity signal in gate 20 due to the reversal of the signal at the output of envelope deriver 4 at every half-cycle increment. This can be seen by inspection of waveforms A to D of FIG. 2. Similar polarity reversal compensation is made in the slave synchronizer by reversing the sense of counting in the slave envelope accumulator each time that a different envelope sampling pulse is selected. The desired result is achieved by the provision of OR gate 111 of FIG. 6 which receives the signals on lines 104 and 102 to generate a signal on line 112 of FIGS. 4 and 6 to actuate switch driver 113 of FIG. 4. By reference to table B of FIG. 6, it can be seen that driver 113 positions switch 69 so that inverter 68 is in circuit each time that the +7.5 or −2.5 microsecond sampling pulse is selected and is out of circuit each time that the +2.5 or −7.5 microsecond sampling pulse is selected.

A five microsecond change in the position of the master envelope sampling pulse is accomplished each time that the master envelope accumulator traverses zero (causing an operation of switch 19) and each time that the count overflows (causing a five microsecond jump in the sampling triggers on line 12). The polarity reversals in the signal being sampled corresponding to the five microsecond displacements of the sampling pulses are compensated for by inverter 32 whereas the polarity reversals resulting from the jumping of divider chain 11 are compensated for by inverter 2.

It is to be noted that inverter 2 not only determines the sense of operation of the master synchronizer but also determines the operation of the slave synchronizer inasmuch as the signal on line 3 at the output of inverter 2 is applied to the slave cycle sampling gate 6 of FIG. 4 as well as to master cycle sampling gate 5 of FIG. 1. The position of switch 39 also determines the phasing of the signal at the output of envelope deriver 4 which is applied jointly to slave envelope sampling gate 64 as well as to master envelope sampling gate 20. Thus, the sense of operation of the master and the slave synchronism servo loops is switched in synchronism so that if the master cycle synchronizer servo loop stablizes at a negative-going carrier cycle null, for example, the slave cycle synchronizer servo loop will follow suit.

The cycle master synchronizer is made capable of synchronizing either to a negative or to a positive-going carrier cycle null, whichever is nearer to the master derived envelope null point. Inasmuch as the corresponding setting of switch 39 for the particular carrier cycle null selected forces the slave cycle synchronizer servo loop to stabilize on the same sense of carrier cycle null, both the master and the slave synchronizers operate stably at whichever carrier cycle null is selected by the master synchronizer. Consequently, when the slave envelope sampling triggers of line 63 are jumped in the process of seeking the slave derived envelope point, the jumps must be limited to ten microseconds each and not five microseconds as is the case of the jumps of the sampling triggers on line 12 of FIG. 1. Otherwise, there would be the possibility that the master synchronizer might seek out a negative-going carrier cycle null, for example, while the slave synchronizer might seek out a positive-going carrier cycle null with a consequent five microsecond error in the ultimately desired time difference measurement.

The measurement of the time difference between the received master and slave loran pulses is accomplished by determining the time difference between the synchronized carrier cycle null sampling pulses on line 21 of FIG. 1 and line 78 of FIG. 4. In a typical case, the pulse on line 21 may start a pulse counter receiving standard clock pulses of known frequency and the pulse on line 78 may be used to stop the pulse counter. The resulting count in the counter can be readily displayed in terms of the time differences between the pulses on lines 21 and 78 which is also the time difference between the received master and slave pulses.

Figure 5:
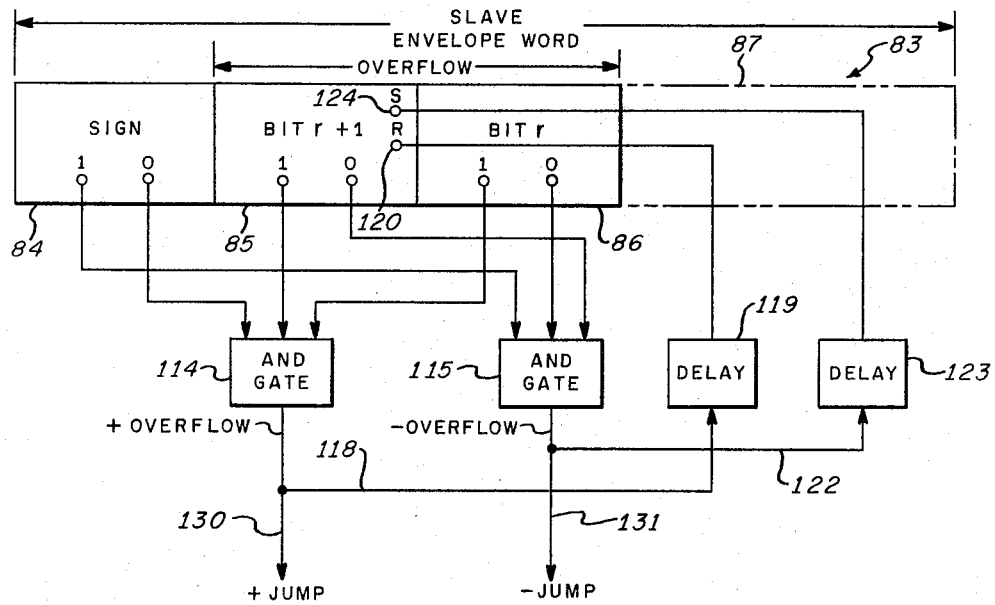
FIGURE 5 is a simplified block diagram of the coarse divider jump and reset logic component represented in FIGURE 4.

The ten microsecond jumps in the slave envelope sampling triggers on line 63, produced each time that the count in the slave envelope accumulator 74 exceeds a positive or a negative maximum value, is accomplished with the aid of the apparatus represented in the simplified block diagram of FIG. 5. The reference numeral 83 in FIG. 5 designates the same register component of the slave envelope accumulator 74 shown in FIG. 6. Stages 84, 85, 86 and 87 of FIG. 5 correspond to the identically numbered stages in FIG. 6 previously discussed. The binary states of stages 84, 85 and 86 of FIGS. 5 and 6 are utilized in different logic combinations and for different purposes. The purpose of the apparatus of FIG. 5 is to control the ten microsecond jumping of the sampling triggers on line 63 of FIG. 4 whereas the purpose of the apparatus of FIG. 6 is to control the actuation of the pulse envelope selection gates 79, 80, 81 and 82 of FIG. 4.

Referring now to FIG. 5, AND gate 114 receives signals representing the "zero" state of stage 84, the "one" state of stage 85 and the "one" state of stage 86. Conversely, AND gate 115 receives signals representing the "one" state of stage 84, the "zero" state of stage 85 and the "zero" state of stage 86. An output from AND gate 114 occurs when there is a positive overflow and an output from AND gate 115 occurs when there is negative overflow. The + overflow on line 130 causes a +10 microsecond jump (i.e., delay) in the output of the slave divider chain (line 63 of FIG. 4). The − overflow on line 131 causes a −10 microsecond jump. At the time of positive overflow, the value in the accumulator exceeds +3K. The overflow causes the accumulator to be reset to approximately +K. This is accomplished by the signal on line 118. The signal on line 118 is delayed in delay 119 and applied to the reset terminal 120 of stage 85 to establish binary state zero. Upon negative overflow, the signal on line 122 is delayed in delay 123 and then applied to the set terminal 124 of stage 85 to establish binary state one.

From the preceding specification, it can be seen that the objects of the present invention have been achieved in the disclosed digitalized species by the provision of master and slave envelope synchronizer servo loops which function in the presence of certain allowable envelope-to-cycle phase relationships in each of the received master and slave loran pulses. The master envelope synchronizer is so designed that it will permit synchronization to a master signal carrier cycle null only in the event that the master envelope error (measured between the selected master carrier cycle null and the master derived envelope null) is less than ±¼ the period of the loran signal carrier. The slave envelope synchronizer is so designed that it will permit synchronization to a slave carrier cycle null only in the event that the difference between the master and slave envelope errors (the slave envelope error being measured between the selected slave carrier cycle null and the slave derived envelope null) is less than ±½ the period of the loran signal carrier.

In the disclosed embodiment, the master envelope error is represented by the duty cycle of the signal on lines 40 and 75 of FIG. 1 which determines in part the selection of the slave envelope sampling pulse. The duty cycle of the signal on line 75 causes a "dithering" of the selected slave envelope sampling gate so as to position it in part in accordance with the magnitude of the master envelope discrepancy. The slave envelope synchronizer servo loop, in the process of aligning the dithering envelope sampling gate to the slave envelope derived point inherently dithers the selected slave sampling gates between such values and with such duty cycles (duty cycle being equal in value to the ratio of the dwell times at each of the selected positions) that a virtual slave envelope sampling gate is generated at the position of the slave derived envelope null so long as the difference between the master and slave envelope errors is less than ±½ the loran carrier. It should be noted that the duty cycles of the slave envelope sampling gates are measures of the slave envelope error. It will be recalled that the duty cycles of the master envelope sampling gates are measures of the master envelope error. Inasmuch as said duty cycles of the slave envelope sampling gates are determined by the additive effects of the slave envelope word duty cycle and the master sign bit duty cycle, it follows that the slave envelope word duty cycle is a measure of the difference between the slave and the master envelope errors. The magnitude of said error difference determines whether the count within the slave envelope accumulator 74 is less than the positive and negative limits of the accumulator or not, e.g., from the truth table in FIG. 6 it can be seen that any envelope error difference in the range 0–5 microseconds can be taken care of by having the slave envelope word dither between values slightly less than and slightly greater than +K. If, on the other hand, the envelope error difference exceeds 5 microseconds, the slave envelope word will continue to increase beyond +K, finally overflowing after reaching +3K. When this happens, a ten microsecond jump is produced in the sampling pulse on line 63. The jumping continues until, finally, the measured envelope error difference is reduced to a value below the accumulator limit.

One final feature of the preferred embodiment requires some description. The ±5 microsecond master divider jump command signals on lines 41 of FIG. 1 are also fed into the slave divider chain (60) in FIG. 4. The purpose of this is to prevent the ±5 microsecond master divider jumps from causing transient errors in the time difference measurement. In normal operation, it is possible under conditions of noise and master envelope errors of nearly 2.5 microseconds, that occasional 5 microsecond master divider chain jumps would occur. If the slave divider is not jumped at the same times, there would be abrupt changes in the difference between the time of occurrence of the sampling pulses on line 21 of FIG. 1 and line 78 of FIG. 4. As was previously described, this time difference is measured in order to determine the time difference between the received master and slave loran pulses. The aforementioned transient errors can be avoided by jumping the slave divider chain synchronously with the master divider chain jumps.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a loran receiver, automatic means for selecting a carrier cycle null of a received loran pulse corresponding to a prescribed point on the leading edge of said pulse comprising first carrier cycle sampling pulse means for selecting a carrier cycle null of said loran pulse, second carrier cycle sampling pulse means synchronously operable with said first means for producing a first signal when the envelope error of said loran pulse represents a time interval more than one-fourth the carrier period of said loran pulse, the envelope error being the time displacement between said prescribed point and the selected carrier cycle null, and third means coupled to said first and second means and responsive to said first signal for changing the time relationship between said loran pulse and the sampling pulses of said first and second means.

2. In a loran receiver, automatic means for selecting a carrier cycle null of a received loran pulse corresponding to a prescribed point on the leading edge of said pulse comprising first sampling pulse means for selecting a carrier cycle null of said loran pulse, second sampling pulse means synchronously operable with said first means for producing a first signal when the envelope error of said loran pulse represents a time interval more than one-fourth the carrier period of said loran pulse, the envelope error being the time displacement between said prescribed point and the selected carrier cycle null, and third means coupled to said first and second means and responsive to said second signal for jumping the time position of the sampling pulses of said first and second means to change the time relationship of said sampling pulses with respect to said loran pulse in increments of multiples of one-half the carrier period of said loran pulse.

3. In a loran receiver, automatic means for selecting a carrier cycle null of a received loran pulse corresponding to a prescribed point on the leading edge of said pulse comprising first carrier cycle sampling pulse means for selecting a carrier cycle null of said loran pulse, second carrier cycle sampling pulse means synchronously operable with said first means for producing a first signal representing the envelope error of said loran pulse, the envelope error being the time displacement between said prescribed point and the selected carrier cycle null, third means coupled to receive said first signal for producing a second signal when said first signal represents a time interval more than one-fourth the carrier period of said loran pulse, and fourth means coupled to said first, second and third means and responsive to said second signal for changing the time relationship between said loran pulse and the sampling pulses of said first and second means.

4. In a loran receiver, automatic means for selecting a carrier cycle null of a received loran pulse corresponding to a prescribed point on the leading edge of said pulse comprising first sampling pulse means for selecting a carrier cycle null of said loran pulse, second sampling pulse means synchronously operable with said first means for producing a first signal representing the envelope error of said loran pulse, the envelope error being the time displacement between said prescribed point and the selected carrier cycle null, third means coupled to receive said first signal for producing a second signal when said first signal represents a time interval more than one-fourth the carrier period of said loran pulse, and fourth means coupled to said first, second and third means and responsive to said second signal for jumping the time position of the sampling pulses of said first and second means to change the time relationship of said sampling pulses with respect to said loran pulse in increments of multiples of one-half the carrier period of said loran pulse.

5. The automatic carrier cycle selection means defined in claim 4 wherein said first sampling pulse means utilizes a first sampling pulse and said second sampling pulse means utilizes second and third sampling pulses, said second and third sampling pulses being time-displaced on respective sides of said first sampling pulse by one-fourth the carrier period of said loran pulse, and said second sampling pulse means includes means for utilizing said second and third sampling pulses in succession for respective time periods representing said envelope error of said loran pulse.

6. In a loran receiver, automatic means for selecting a carrier cycle null of a received slave loran pulse corresponding to the selected carrier cycle null of a received master loran pulse, said means comprising first carrier cycle sampling pulse means for selecting a carrier cycle null of said master loran pulse, second carrier cycle sampling pulse means synchronously operable with said first means for producing a first signal representing the envelope error of said master loran pulse, the envelope error being the time displacement between said prescribed point and the selected carrier cycle null, third sampling pulse means for selecting a carrier cycle null of said slave loran pulse, fourth sampling pulse means synchronously operable with said third means and coupled to receive said first signal for producing a second signal when the difference between the envelope errors of said master and slave loran pulses represents a time interval more than one-half the carrier period of said master and slave loran pulses, and fifth means coupled to said third and fourth means and responsive to said second signal for changing the time relationship between said slave loran pulse and the sampling pulses of said third and fourth means.

7. In a loran receiver, automatic means for selecting a carrier cycle null of a received slave loran pulse corresponding to the selected carrier cycle null of a received master loran pulse, said means comprising first sampling pulse means for selecting a carrier cycle null of said master loran pulse, second sampling pulse means synchronously operable with said first means for producing a first signal representing the envelope error of said master loran pulse, the envelope error being the time displacement between said prescribed point and the selected carrier cycle null, third sampling pulse means for selecting a carrier cycle null of said slave loran pulse, fourth sampling pulse means synchronously operable with said third means and coupled to receive said first signal for producing a second signal when the difference between the envelope errors of said master and slave loran pulses represents a time interval more than one-half the carrier period of said master and slave loran pulses, and fifth means coupled to said third and fourth means and responsive to said second signal for jumping the time position of the sampling pulses of said third and fourth means to change the time relationship of said sampling pulses with respect to said slave loran pulse in increments of multiples of the carrier period of said master and slave loran pulses.

8. The automatic carrier cycle selection means defined in claim 7 wherein said third sampling pulse means utilizes a first sampling pulse and said fourth sampling pulse means utilizes second, third, fourth, and fifth sampling pulses, said second and third sampling pulses being time-displaced on respective sides of said first sampling pulse by one-fourth the carrier period of said master and slave loran pulses, and said fourth and fifth sampling pulses being time-displaced on respective sides of said first sampling pulse by three-fourths said carrier period, and said fourth sampling pulse means includes means for utilizing said second, third, fourth and fifth sampling pulses in succession for respective time periods representing said envelope error of said slave loran pulse.

9. In a loran receiver, automatic means for selecting a carrier cycle null of a received loran pulse corresponding to a prescribed point on the leading edge of said pulse comprising first sampling pulse means for selecting a carrier cycle null of said loran pulse, second sampling pulse means synchronously operable with said first means for producing a signal having a characteristic representing the magnitude of the envelope error of said loran pulse, the envelope error being the time displacement between said prescribed point and the selected carrier cycle null, and third means coupled to said second means and responsive to said characteristic of said signal for recurrently changing the time relationship between said loran pulse and the sampling pulse of said second means between different amounts at times determined by the value of said characteristic.

10. In a loran receiver, automatic means for selecting a carrier cycle null of a received loran pulse corresponding to a prescribed point on the leading edge of said pulse comprising first sampling pulse means for selecting a carrier cycle null of said loran pulse, second sampling pulse means synchronously operable with said first means for producing a signal having a characteristic representing the magnitude of the envelope error of said loran pulse, the envelope error being the time displacement between said prescribed point and the selected carrier cycle null, said second means including means for utilizing first and second sampling pulses in succession, and third means coupled to said second means and responsive to said characteristic of said signal for recurrently utilizing said first and second sampling pulses for respective time periods determined by the value of said characteristic whereby the time relationship between said loran pulse and the utilized sampling pulse is changed from a first amount to a second amount at times determined by the value of said characteristic.

11. In a loran receiver, automatic means for selecting a carrier cycle null of a received loran pulse corresponding to a prescribed point on the leading edge of said pulse comprising first sampling pulse means for selecting a carrier cycle null of said loran pulse, second sampling pulse means synchronously operable with said first means for producing a signal having a characteristic representing the magnitude of the envelope error of said loran pulse, the envelope error being the time displacement between said prescribed point and the selected carrier cycle null, said second sampling means including means for utilizing a plurality of sampling pulses in succession, and third means coupled to said second means and responsive to said characteristic of said signal for recurrently utilizing each of said plurality of sampling pulses for respective time periods determined by the value of said characteristic whereby the time relationship between said loran pulse and the utilized sampling pulse is changed between different amounts at times determined by the value of said characteristic.

12. In a loran receiver, automatic means for selecting a carrier cycle null of a received slave loran pulse corresponding to the selected carrier cycle null of a received master loran pulse, said means comprising first sampling pulse means for selecting a carrier cycle null of said master loran pulse, second sampling pulse means synchronously operable with said first means for producing a first signal having a characteristic representing the magnitude of the envelope error of said master loran pulse, the envelope error being the time displacement between said prescribed point and the selected carrier cycle null, third sampling pulse means for selecting a carrier cycle null of said slave loran pulse, fourth sampling pulse means synchronously operable with said third means and coupled to receive said first signal for producing a second signal having a characteristic representing the magnitude of the difference between the envelope errors of said master and slave loran pulses, and fifth means coupled to said fourth means and responsive to said characteristic of said second signal for recurrently changing the time relationship between said slave loran pulse and the sampling pulse of said fourth means between different amounts at times determined by the value of said characteristic of said second signal.

(References on following page)

References Cited

UNITED STATES PATENTS

| | | | |
|---|---|---|---|
| 2,728,909 | 12/1955 | Palmer | 343—103 X |
| 2,882,526 | 4/1959 | Musselman | 343—103 |
| 2,932,022 | 4/1960 | Durbin et al. | 343—103 |
| 3,044,064 | 7/1962 | Durbin | 343—103 |

RODNEY D. BENNETT, *Primary Examiner.*

H. C. WAMSLEY, *Assistant Examiner.*